United States Patent

Doshi et al.

[11] Patent Number: 5,569,693
[45] Date of Patent: Oct. 29, 1996

[54] HIGH STRETCH FILM FOR PALLET WRAPPING

[75] Inventors: Anil G. Doshi, East Hampstead; Frank T. Kos, Salem, both of N.H.; Dattaram C. Salkar, Tewksbury, Mass.

[73] Assignee: Borden Inc., Columbus, Ohio

[21] Appl. No.: 463,859

[22] Filed: Jun. 5, 1995

[51] Int. Cl.$^6$ .................. C08J 3/18; C08K 5/10; B32B 27/32
[52] U.S. Cl. .......... 524/317; 524/484; 524/490; 524/491; 525/240; 428/516
[58] Field of Search .............. 524/484, 490, 524/491, 317; 525/240; 428/516

[56] References Cited

U.S. PATENT DOCUMENTS

| | | | |
|---|---|---|---|
| 4,337,188 | 6/1982 | Climenhage et al. | 524/528 |
| 4,362,835 | 12/1982 | Phillips, Jr. | 525/240 |
| 4,367,256 | 1/1983 | Biel | 428/218 |
| 4,379,197 | 4/1983 | Cipriani et al. | 428/516 |
| 4,542,188 | 9/1985 | van der Heijden | 525/240 |
| 4,587,303 | 5/1986 | Turtle | 525/240 |
| 4,588,650 | 5/1986 | Mientus et al. | 428/516 |
| 4,664,866 | 5/1987 | van der Heijden | 264/519 |
| 4,680,330 | 7/1987 | Berrier et al. | 524/481 |
| 4,996,094 | 2/1991 | Dutt | 428/516 |
| 5,085,927 | 2/1992 | Dohrer | 428/516 |
| 5,112,674 | 5/1992 | German et al. | 428/516 |
| 5,114,763 | 5/1992 | Brant et al. | 428/516 |
| 5,334,428 | 8/1994 | Dobreski et al. | 428/516 |
| 5,341,557 | 8/1994 | Perlman | 428/35.7 |
| 5,407,732 | 4/1995 | Dokurno | 428/213 |

*Primary Examiner*—Paul R. Michl
*Assistant Examiner*—Olga Asinovsky
*Attorney, Agent, or Firm*—Watson Cole Stevens Davis, P.L.L.C.

[57] ABSTRACT

An improved stretch/cling film suitable for pallet wrap, produced by the blown film process exhibits superior performance qualities similar to stretch cling film produced by the cast film process, but with an improved tear resistance; such film has reduced noise characteristics. The film of the invention is produced by blending 40 to 80% by weight linear low density polyethylene polymerized with an α-olefin comonomer having a melt index range of 0.8 to 1.2 and a density range of 0.916 to 0.920; with 60 to 20% by weight of a flexible semi-crystalline polyethylene with a melt index 0.8 to 2.0 and a density of 0.86 to 0.91; with 3 to 9% by weight liquid polyolefin and 0.1 to 4.0% by weight of a surfactant. The films of the invention exhibit a two-sided cling.

8 Claims, 1 Drawing Sheet

HIGH STRETCH FILM FOR PALLET WRAPPING

FIELD OF THE INVENTION

The present invention relates to monolayer stretch cling film produced by the blown film process.

BACKGROUND OF THE INVENTION

In the packaging and/or palletizing art, it is known to package individual articles and/or to bundle together or palletize a plurality of articles using a so-called "stretch wrapping" technique. According to such technique, a relatively thin film web of a polymeric material is stretched or elongated, creating tension in the film web, while being wrapped several times around the article or articles to be packaged or palletized. Upon the release of the stretching or elongating forces, at the conclusion of the wrapping operation, the film attempts to relax or spring at least partially back to its original non-stretched dimension thereby tightly or snugly engaging the article or articles wrapped therein. In connection with such a stretch wrapping operation, it is possible in theory to secure the stretched and wrapped film in place around the packaged article or articles in a variety of ways (i.e. so as to prevent the stressed or tensioned film from returning or relaxing back to its original dimensions). However, as a matter of practical expediency, efficiency and economy, it is common practice to employ film which exhibits sufficient cling to itself to hold the film in place around the packaged article, to prevent significant slippage of the stretched overlaid film layers, and to prevent relaxation or shrinkage of the film back to its original pre-packaging unstretched dimensions.

While a variety of films are currently available on the commercial market for use in stretch/cling packaging or palletizing operations, such currently available films all suffer from one or more notable deficiencies, drawbacks, or limitations. For example, some of the films which are currently available are produced via the cast film processes. While such cast films are typically characterized by having high Elmendorf tear ratings in the transverse direction, they also generally have relatively low tear resistance in the machine direction. As such, these cast films have a pronounced tendency to tear on the corners or at other sharp protrusions of articles being stretch wrapped or palletized therewith.

Second, because the cast films exhibit a tendency to tear, it is desirable to produce films by blown methods. Such films are generally stronger than cast films. Blown films, on the other hand possess a higher molecular weight, having a melt index of 1 and a density of approximately 0.918. Such films, however, do not possess the levels of stretch desired, so that more force is required to stretch the film. Increased forces, of course, result in greater wear and tear on machines and other equipment.

Third, many blown films upon being unraveled and stretched from a storage roll or packaged pallet wrap or the like are noisy. When used to palletize a plurality of articles, the film creates noise at levels of about 88–95 dB. Though not painful to many, such noise levels are uncomfortable and sustained exposure to such noise levels, without protective ear gear, will result in both temporary and permanent hearing deficiencies.

SUMMARY OF THE INVENTION

In view of the foregoing deficiencies, it would be highly desirable to produce films by the blown process having properties more closely resembling the stretch properties of cast film, and when unraveled exhibit a reduction in noise levels relative to the prior art compositions.

Accordingly, an object of the invention is to produce a blown film having stretch characteristics similar to cast films.

Another object of the invention is to produce a blown film, which upon being unwound for pallet wrapping generates a noise level of below 88 dB. These and other objects will be made apparent by reference to text and appended claims set forth below.

In accordance with the present invention, an improved stretch/cling film suitable for pallet wrap, produced by the blown film process exhibits superior performance qualities similar to stretch cling film produced by the cast film process, in terms of stretch performance; such film also has reduced noise characteristics. The film of the invention is produced by blending 40 to 80% by weight linear low density polyethylene polymerized with an α-olefin comonomer having a melt index range of 0.8 to 1.2 and a density range of 0.916 to 0.920; with 60 to 20% by weight of a flexible semi-crystalline polyethylene copolymer having a melt index 0.8 to 2.0 and a density of 0.86 to 0.91; with 3 to 9% by weight liquid polyolefin and 0.1 to 4.0% by weight of a surfactant.

DETAILED DESCRIPTION OF THE INVENTION

Figure 1:
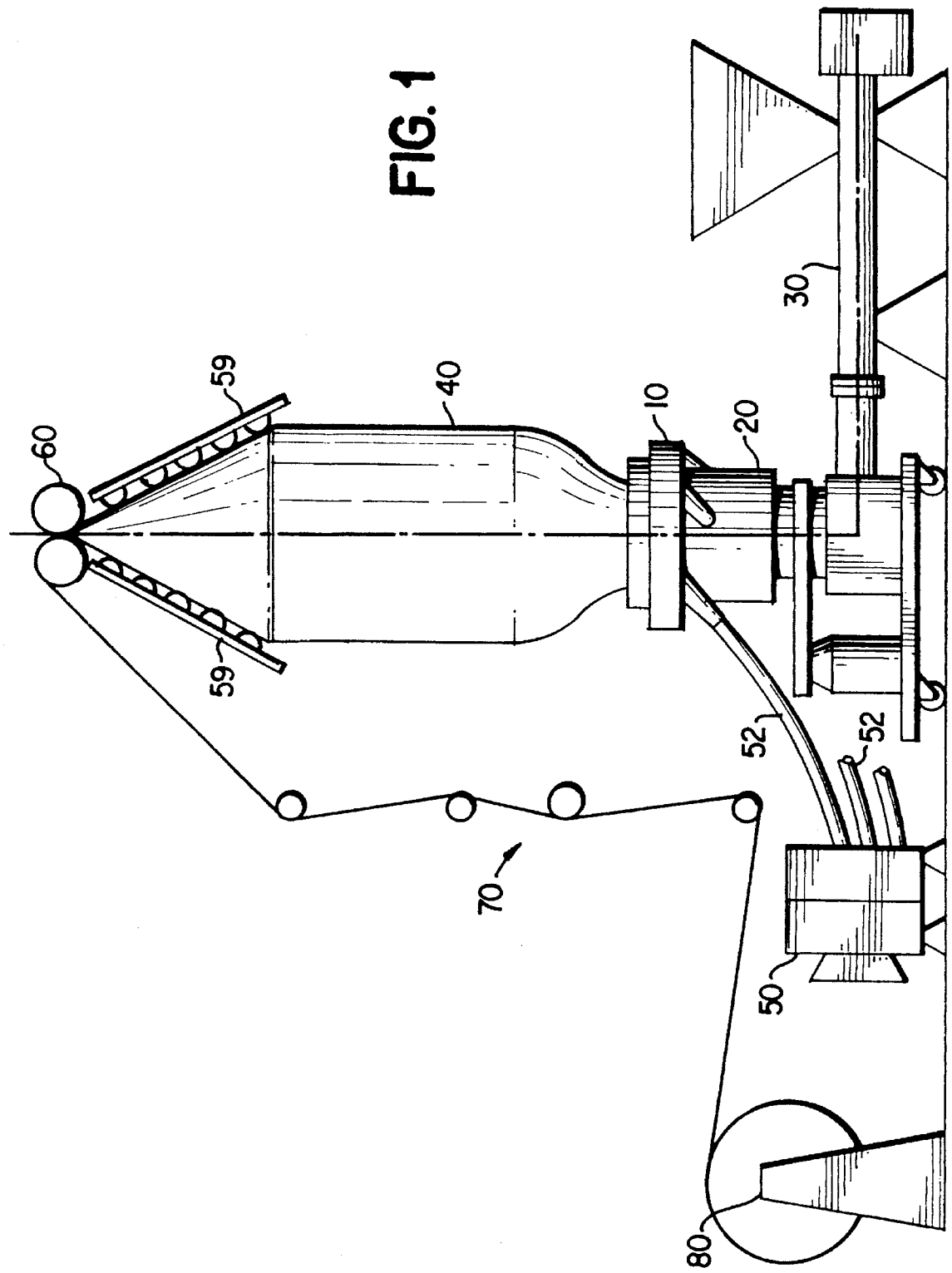
FIG. 1 is an elevation view showing the general configuration of a blown film line.

The films of the present invention are characterized not only by reduced noise levels and overall improved properties, but also by an evenly matched two-sided cling. More specifically, each side of or face of the film of the invention possesses substantially similar cling properties. As is known in the art, the cling of polyethylene and polyethylene containing films can be increased by adding tackifying agents to mixtures used to form the final films. Such tackifying agents are capable of increasing the inherent cling of the film by between 100 and 250%. Cling is measured by ASTM D 4649. Cling is the strength, in grams, required to pull the test film apart at the overlap.

The tackifying agent of the claimed invention is a liquid polyolefin preferably having a number average molecular weight greater than 1100, preferably greater than 1300, and up to a number average molecular weight of up to about 1500. The tackifier has a specific gravity range of 0.887 to 0.92. Suitable tackifying agents include hydrocarbon resin such as terpene resin, hydrogenated resins, and resin esters, atactic polypropylenes, polybutenes and the like. Most preferably, the tackifier of the invention is polybutene having a number average molecular weight of 1300 and specific gravity of 0.905. Preferably the tackifier is present in the composition of the invention in an amount of 3 to 9% by weight, and more preferably in amounts of 3.5–4.0%.

It is also known in the art to use auxiliary components, in combination with a tackifier. U.S. Pat No. 4,425,268 herein incorporated by reference teaches the use of tackifiers in combination with components which include alkali metal stearates and monoesters of fatty acids and polyols. Specific compounds include glycerol mono-oleate or an ester of sorbitan. Such auxiliary compounds are present in a film blend in a proportion of between about 0.25 to about 3.0% by weight. It is disclosed in U.S. Pat. No. 4,425,268 that such compounds are used to convey tackifiers to the film surface and to impart preferential one-sided cling to such films.

In the present invention, surfactants are used in amounts to reduce noise associated with the unravelling of pallet wrap. The use of surfactants in the present invention does not lead to differential cling properties. In fact the two faces of the film exhibit an equal amount of cling. In particular, the surfactants are used in amounts of 0.1 to 4.0% by weight of the film composition, preferably in amounts of 0.3 to 0.5% and most preferably in an amount of 0.45% by weight of the composition. Suitable surfactants include monoesters of a polyol, such as, for example, glycerol or sorbitan and a fatty acid of 10–20 carbon atoms. Preferably the surfactant is sorbitan mono-oleate.

Preferably the ratio range of the tackifier to the surfactant is between about 2.0 and 9.2, more preferably 5 to 8.8, and most preferably the ratio is 7.7.

The polymer blend used to prepare the two-sided cling film of the invention, having reduced noise characteristics and film properties more nearly like those of cast films is formed of homo and/or copolymers derived from ethylenically unsaturated monomers exhibiting different densities such that when blended with the tackifier and surfactant, the film exhibits the improved properties discussed above.

In general, the polymeric composition of the invention will contain two different polymers. The first of these polymers is a linear low density polyethylene polymer, sometimes referred to herein as polymer 1, present in amounts of 40–80% by weight of the overall composition, having a density of about 0.916 to 0.920 and preferably 0.918, a melt index range of 0.8 to 1.2 percent, and a crystallinity of about 47%.

The second of the two polymers is a semi-crystalline α-olefin polymer sometimes referred to as polymer 2, having a density of about 0.860 to 0.910 preferably 0.905 in amounts of 60–20% by weight of the overall composition, a melt index of 0.8 to 2.0 preferably 0.9, and a degree of crystallinity of about 38%.

The polymer exhibiting the greater density, polymer 1, is preferably a conventional linear low density polyethylene polymerized with an α-olefin comonomer and typically used in blown film processes. Loadmaster™ polymers, manufactured and sold by Borden can be used and are generally composed of ethylene and/or a $C_4$ α-olefin or higher, for example 1-butene, 1-pentene, 4-methyl-1-pentene, 1-hexene, 1-octene, 1-decene, 1-dodecen etc. including copolymers of one or more such olefinic monomers, such as 1-butene and 1-hexene. Other conventional linear low-density polyethylenes can be used.

The second polymer exhibiting the lower or smaller density is also prepared by copolymerizing ethylene with one or more comonomers such as 1-butene, 1-pentene, 4-methyl-1-pentene, 1-hexene, 1-octene, 1-decene, 1-dodecen etc. Preferably, such comonomers include butene and 1-hexene. The polymer may even be a terpolymer of ethylene, butene and 1-hexene.

In order to obtain the uniform two-sided cling properties of the invention the tackifier and the surfactant are thoroughly and uniformly blended with the two polymer components of the invention. Uniform and complete mixing is obtained by mixing the tackifier and the surfactant with granules of the polymers rather than conventional pellets. Specifically, granular co-polymers of a mean diameter size of about 1/32 of an inch are added to a high intensity mixer containing the tackifier and the surfactant. The mix is free-flowing and can be fed to an extruder and melted at conventional temperatures and extruded according to standard blow film or "bubble" processing techniques. Cooling of each of the resulting tubular films is conducted by blowing ambient air across the external film surface.

FIG. 1 shows an overall typical configuration of an apparatus for producing blown film. As shown, an extruder 30 is operably connected with an annular die assembly 20. An air ring assembly 10 is located adjacent to the discharge side of an annular die assembly 20.

On extrusion, tubular extruded plastic is inflated from the interior, cooled and then flattened by nip rolls 60 and optionally by a set of collapsers 59. The flattened and collapsed film is then longitudinally cut and the two halves are led to separate winding devices 80 of conventional construction by guiding and transfer means 70.

Connected to air ring 10 is a blower assembly 50 attached by one or more conduits 52. In a preferred embodiment of the invention, the ring assembly is a dual flow air ring as disclosed in U.S. Pat. No. 4,750,874 herein incorporated by reference.

In operation, blown film tube 40 is produced from a mixture of granular polymers 1 and 2, a tackifier and a surfactant preferably as described. These components of the mixture are thoroughly and uniformly blended in a high intensity mixer to obtain a free flowing mix. The blend is extruded and forced from a circular die 20 at temperatures in the range of from about 220° C. to 240° C. and then blown, forming tube 40. Die 20 is of conventional construction and may be a single or multiple die rotating or non-rotating system. It is preferable that the system be rotatable when used in conjunction with winding devices 80.

From cooling ring 10 a cooling air flow contacts the outside of tube 40 after extrusion. The temperature of the air flow is about between 20° C. to 30° C. Nip rolls 60 assist in collapsing the film, and the film is then split and then rolled.

Rolling of the film can impart significant properties to the film. In practice a tension differential is maintained between the winding mechanism and the nip rolls.

In the events leading to production of the films of the invention it was observed that the addition of polymer 2 in amounts of greater than 45 percent produced extruded films of improved flexibility and cling but exhibited unacceptable telescoping. Cling and flexibility could be further improved by additions of polymer 2 of up to amounts of 50%–60% but such amounts led to even greater telescoping during storage of the rolls. The present inventors then found that by maintaining polymer 2 percentages at levels of about 40% it was possible to produce extruded films with improved flexibility and cling properties similar to those exhibited by a product containing 50% of polymer 2, when the formed film tube was cooled with a dual flow air ring disclosed in U.S. Pat. No. 4,750,874 supra. Benefits can also be realized using such dual flow air ring for compositions containing less than 40% of polymer, i.e., 20%–40% of polymer 2. In essence the force-to-stretch properties of the compositions of the invention are improved using a dual flow air ring.

Not wishing to be bound by any theory regarding the benefit of using such a dual flow air ring, it appears that the support generated by successive streams of cooling air to the exterior surface of the film tube 40 during tube preparation and/or uniform cooling by the air flows emanating from the ring leads to the unexpected result of greater flexibility and cling relative to reduced amounts of polymer 2.

The monolayer stretch films of the invention exhibit performance characteristics or qualities similar to cast stretch films and better performance characteristics than commercial mono- and multi-layer blown stretch films.

The films of the invention can withstand stretch levels of 270% and higher on powered pre-stretch pallet wrap machines without failure while maintaining excellent wrap, clarity, cling, puncture and load properties. The film also offer biaxial stretch (MD and TD direction). A low force to stretch the film allows the film to be used interchangeably on powered pre-stretch pallet wrap machines that have historically been adjusted and set-up to operate with cast films.

The invention is further illustrated by reference to the Examples and Tables below:

EXAMPLE 1

Fifty-seven parts by weight (171 lbs) of polymer 1, composed of linear low density polyethylene resin sold by Exxon under the designation LL1001.09 and having a density of 0.918 g/cc and a melt index of 1.0, and 38 parts by weight (114 lbs) of polymer 2, a very low density (0.905) granular polyethylene having a melt index of 0.8 were added to a liquid mixture of 12 lbs (4 parts by weight of the final mixture) of polyisobutylene having a number average molecular weight of 1300, and a specific gravity of 0.905, sold under the designation PB32 by Soltex, and 1.30 lbs (0.45 parts by weight) of sorbitan mono-oleate sold under the description Glycomul O by Lonza.

The four components were mixed in a high-speed mixer to produce a free-flowing uniform granule product. The product was added to an extruder and melted. A film was extruded from the melted blend by passage through a blown film die having a 0.09 inch die gap at approximately 430° F. The film was cooled by a dual lip or dual flow air ring. The film was subjected to testing, and the results are reported in Table 1 infra.

EXAMPLE 2

The procedure of Example 1 was repeated except this film was composed of 76 parts of resin 1 (228 lbs), 19 parts (57 lbs) of resin 2, 4 parts by weight (12 lbs) of polyisobutylene and 0.45 parts by weight (1.30 lbs) of sorbitan mono-oleate. The produced film prepared as described in Example 1 was subjected to the test of Example 1, and the results are reported below:

EXAMPLE 3

The procedure of Example 1 was repeated except the film was composed of 47.50 parts (142 lbs) of polymer 1, 47.50 parts (142 lbs) of polymer 2, 4 parts by weight of polyisobutylene and 0.45 parts by weight of sorbitan mono-oleate.

The film was subjected to standard industry testing, and the results are reported in Table 1 below.

EXAMPLE 4

The procedure of Example 1 was repeated except the film was composed of 66.50 parts (200 lbs) of polymer 1, 28.50 parts (86 lbs) of polymer 2, 4 parts by weight (12 lbs) of polyisobutylene and 0.45 Parts by weight (130 lbs) of sorbitan mono-oleate.

The produced film was subjected to standard industry testing, and the results are reported in Table 1 below.

TABLE 1

| | | \multicolumn{6}{c}{RESULTS} | | | | | |
|---|---|---|---|---|---|---|---|
| | | TLC cast film | Loadmaster blown film | Exp. 1 | Exp. 2 | Exp. 3 | Exp. 4 |
| TENSILE STRENGTH | MD | 7500 | 7500 | 7476 | 7322 | 6450 | 7338 |
| | TD | 4500 | 4250 | 4074 | 3980 | 4550 | 3962 |
| ELONGATION | MD | 680 | 709 | 634 | 666 | 702 | 642 |
| | TD | 940 | 995 | 1015 | 990 | 908 | 1001 |
| 100% Modulus | MD | 1400 | 1700 | 1612 | 1537 | 1300 | 1522 |
| | TD | 1250 | 1300 | 1187 | 1251 | 1150 | 1235 |
| TEAR STRENGTH | MD | 171 | 45 | 55 | 34 | 110 | 47 |
| | TD | 519 | 422 | 359 | 337 | 232 | 341 |
| Ball Burst | | 6.2 | 4.3 | 5.4 | 4.9 | 6.7 | 5.2 |
| Highlight % Stretch | | 250% | 165% | 256% | 231% | 287% | 242% |
| Telescoping | | Pass | Pass | Pass | Pass | Fail | Pass |
| ASTMD 4649 | 100% | 200 | 217 | 235 | 270 | 275 | 275 |
| Cling | 200% | 132 | 142 | 212 | 230 | 230 | 235 |
| Unwind noise at 250% stretch | | 74 dB | 78 dB | 80 dB | 81 dB | 83 dB | 82 dB |

TLC film is a control, i.e., a typical film produced by the cast process.

Loadmaster™ film is a control, i.e., a typical film produced by the blown film method.

The tensile strength, elongation and 100% modulus tests were conducted in accordance with ASTM D882. Tear strength and ball burst were conducted in accordance with ASTM D1922 and ASTM D3420, respectively.

The highlight stretch procedure is performed on a Highlight Industries Synergy 3HP machine. This test is a quick measure of the stretch performance of pallet wrap films. Utilizing the hydro-stretch powered pre-stretch system of this machine, the percentage of stretch occurring between two rollers can be easily adjusted to any specific level. Data collected for Table 1 is obtained by stretching the control cast film to a level of 250%. With the machine set-up for this control film, i.e. calibrated, the high performance blown films of the present invention are stretched between the two rollers of the machine and compared. The force required to stretch the films of invention is equal to or less than the force necessary to stretch the cast film to obtain a similar or improved result.

In addition, the standard blown film is also tested. Aside from the actual measured stretch performance as an indicator of "equal film force to stretch properties", film modulus values also listed in Table 1 correlate directly to stretch performance; a higher value generally indicating a stiffer film and hence, a reduction in percentage stretch under the same machine conditions.

Telescoping is an objective test procedure based on observations of roll stability (i.e., prevention of roll deformation) at elevated temperatures simulating long-term storage conditions. Results provide an indication that roll winding tension employed during fabrication is within processing specifications.

Following the production of film and the winding of film into rolls, the roll widths are measured. The rolls are then placed in an oven set at 150% F for a period of three days. After three days the rolls are removed and roll width is again measured. If the width has increased by about 25%, then the roll is deemed "fail" If the roll width remains unchanged or has an increase of less than 25%, then the roll is deemed "pass".

COMPARATIVE EXAMPLE 1

The procedure of Example 1 was repeated except that film A was composed of 57.6 parts by weight of polymer 1, 38.4 parts by weight of polymer 2, 3.5 parts by weight of polyisobutylene and 0.45 parts by weight of sorbitan monoleate. Comparison samples B and C were prepared in a similar manner less an ingredient as more fully explained by the text below and as shown in Table 2. The compositions of A, B and C are set forth in Table 2.

Film A, a film of the claimed invention contains both isobutylene and sorbitan mono-oleate in amounts within the target ranges of the invention. Comparison film B contains no sorbitan mono-oleate and comparison C contains no polybutene.

The noise and cling properties of compositions A, B and C are set forth below.

TABLE 2

| Sample | A | B | C | Test Method |
|---|---|---|---|---|
| Butene LLDPE resin | 57.6 | 57.9 | 59.7 | |
| VLDPE resin | 38.4 | 38.6 | 39.8 | |
| PiB | 3.5 | 3.5 | — | |
| SMO | 0.45 | — | 0.45 | |
| Noise during unwind (dB) | | | | |
| @0% stretch | 83 | 94 | 78 | |
| @250% stretch | 80 | 87 | 78 | |
| Cling, gms | | | | |
| @100% stretch | 235 | 335 | 67 | ASTM 4649 |
| @200% stretch | 212 | 285 | 67 | |

As seen from Table 2, film C produces the smallest noise level on being unwound from storage rolls, with and without a simultaneous stretch. However, film C exhibits an unacceptable cling property of only 67 grams. This is unacceptable for pallet wrapping wherein minimum standards require a cling of at least 70 grams.

Film B containing the tackifier devoid of sorbitan monoleate exhibits excellent cling properties but creates unacceptable noise levels when unraveled from a storage roll regardless of whether unraveling occurs with or without stretch.

Only film A of films A, B and C exhibits acceptable cling properties and reduced and acceptable noise levels upon being unraveled when unaccompanied or accompanied with stretch. Composition A is representative of the present invention.

Various changes could be made in the above method and products without departing from the scope of the invention. It is intended that all matter contained in the description shall be interpreted as illustration and is not meant to limit the invention.

What is claimed is:

1. A two-sided cling wrap film, consisting of:
    40 to 80% by weight of a linear low density polyethylene polymerized with an α-olefin comonomer having a melt index range of 0.8 to 1.2 and a density range of 0.916 to 0.920;
    60 to 20% by weight of a flexible semi-crystalline ethylene α-olefin copolymer having a melt index of 0.8 to 2.0 and a density range of 0.86 to 0.91;
    3 to 9% by weight of a liquid polyolefin; and
    0.1 to 4.0% by weight of a sorbitan mono-oleate.

2. The cling wrap film of claim 1 wherein the cling of a first face of the film is substantially equal to the cling of a second face.

3. The cling wrap film of claim 1 wherein the liquid polyolefin is selected from the group consisting of polybutylene, polyoctene and polyhexene.

4. The cling film of claim 3 wherein the liquid polyolefin is polyisobutylene with a specific gravity of between 0.887 to 0.92.

5. The cling film of claim 1 wherein the ratio of liquid polyolefin to surfactant is between 5 and 8.8.

6. The cling film of claim 1 wherein said semi-crystalline ethylene α-olefin has a crystallinity of about 47%.

7. The cling film of claim 1 wherein said flexible semi-crystalline ethylene polymer is a comonomer produced from ethylene, butene and 1-hexane.

8. The cling wrap of claim 1 where sorbitan monooleate is present in amounts of 0.1 to 0.45%.

* * * * *